(12) United States Patent
Saloio et al.

(10) Patent No.: US 10,585,003 B2
(45) Date of Patent: Mar. 10, 2020

(54) TEMPERATURE MEASUREMENT INTEGRATED CIRCUIT WITH FLEXIBLE CABLE AND SENSING ELEMENT

(71) Applicant: Hamilton Sundstrand Corporation, Charlotte, NC (US)

(72) Inventors: James Saloio, Ludlow, MA (US); James Peter Wivell, Southington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 49 days.

(21) Appl. No.: 15/452,033

(22) Filed: Mar. 7, 2017

(65) Prior Publication Data

US 2018/0259397 A1    Sep. 13, 2018

(51) Int. Cl.
| | | |
|---|---|---|
| *G01K 1/14* | (2006.01) | |
| *G01K 7/00* | (2006.01) | |
| *G01K 1/16* | (2006.01) | |
| *G01K 7/24* | (2006.01) | |

(52) U.S. Cl.
CPC ............... *G01K 1/14* (2013.01); *G01K 1/16* (2013.01); *G01K 7/00* (2013.01); *G01K 7/24* (2013.01)

(58) Field of Classification Search
CPC ...................................................... G01K 1/143
See application file for complete search history.

(56) References Cited

U.S. PATENT DOCUMENTS

| | | | | |
|---|---|---|---|---|
| 3,852,570 A | * | 12/1974 | Tyler ................. | H05B 3/36 219/528 |
| 5,864,465 A | * | 1/1999 | Liu ................... | G06F 1/206 174/16.3 |
| 6,084,178 A | * | 7/2000 | Cromwell ........... | H01L 23/32 174/16.3 |

(Continued)

FOREIGN PATENT DOCUMENTS

| | | |
|---|---|---|
| EP | 1510801 A1 | 3/2005 |
| EP | 2851664 A1 | 3/2015 |

(Continued)

OTHER PUBLICATIONS

Intel Celeron Processor 400 Series Thermal and Mechanical Design Guidelines, Appendix D (Year: 2008).*

(Continued)

*Primary Examiner* — Clayton E. LaBalle
*Assistant Examiner* — Leon W Rhodes, Jr.
(74) *Attorney, Agent, or Firm* — Cantor Colburn LLP

(57) ABSTRACT

A temperature sensing system includes a temperature sensing element. The temperature sensing element is bondable to an exterior surface of an electronic component and configured to sense a temperature at an interior of the electronic component. The system further includes a flexible cable operatively connected to the temperature sensing element, and a signal conditioning unit operatively connected to a distal end of the flexible cable. The signal conditioning unit is mountable to a printed circuit board proximate to the electronic component. The signal conditioning unit is configured to receive a signal from the temperature sensing element, and output a signal indicative of the temperature at the interior of the electronic component.

20 Claims, 2 Drawing Sheets

(56) References Cited

U.S. PATENT DOCUMENTS

| | | | |
|---|---|---|---|
| 6,377,453 B1 * | 4/2002 | Belady | H05K 7/20345 |
| | | | 165/185 |
| 6,448,642 B1 * | 9/2002 | Bewley | H01L 23/40 |
| | | | 257/719 |
| 7,102,889 B1 * | 9/2006 | Barsun | H01L 23/4093 |
| | | | 165/185 |
| 7,210,346 B1 | 5/2007 | Hoover et al. | |
| 7,269,018 B1 * | 9/2007 | Bolich | H01L 23/4093 |
| | | | 165/185 |
| 7,416,332 B2 | 8/2008 | Rountree et al. | |
| 8,038,346 B2 | 10/2011 | Hsieh | |
| 8,303,179 B2 | 11/2012 | Owen et al. | |
| 8,790,008 B2 * | 7/2014 | Flemin | G01K 1/143 |
| | | | 136/200 |
| 8,905,635 B2 | 12/2014 | Clark et al. | |
| 9,213,361 B1 | 12/2015 | Urban | |
| 9,496,587 B2 | 11/2016 | Jung | |
| 2002/0071475 A1 | 6/2002 | Betzner et al. | |
| 2002/0075024 A1 * | 6/2002 | Fredeman | G01R 1/0458 |
| | | | 324/750.05 |
| 2006/0203881 A1 | 9/2006 | Hsieh | |
| 2009/0024345 A1 * | 1/2009 | Prautzsch | H01L 23/34 |
| | | | 702/99 |
| 2010/0172392 A1 * | 7/2010 | Katzenberger | G01K 1/14 |
| | | | 374/166 |
| 2013/0288091 A1 * | 10/2013 | Tsubaki | G01K 1/14 |
| | | | 429/90 |
| 2017/0131156 A1 * | 5/2017 | Miura | G01K 7/22 |

FOREIGN PATENT DOCUMENTS

| | | | |
|---|---|---|---|
| JP | 07291200 A | * | 11/1995 |
| JP | 2015099087 A | * | 5/2015 |
| KR | 20160061638 A | | 6/2016 |
| WO | 2007143191 A2 | | 12/2007 |

OTHER PUBLICATIONS

European Search Report for Application No. 18160458.8-1001; dated Jul. 6, 2018; 8 pgs.

European Official Action for Application No. 18160458.8, dated Oct. 9, 2019, 46 pages.

Wikipedia Flexible electronics, https://en.wikipedia.org/wiki/Flexible_electronics, Retrieved on Sep. 26, 2019, 10 pages.

* cited by examiner

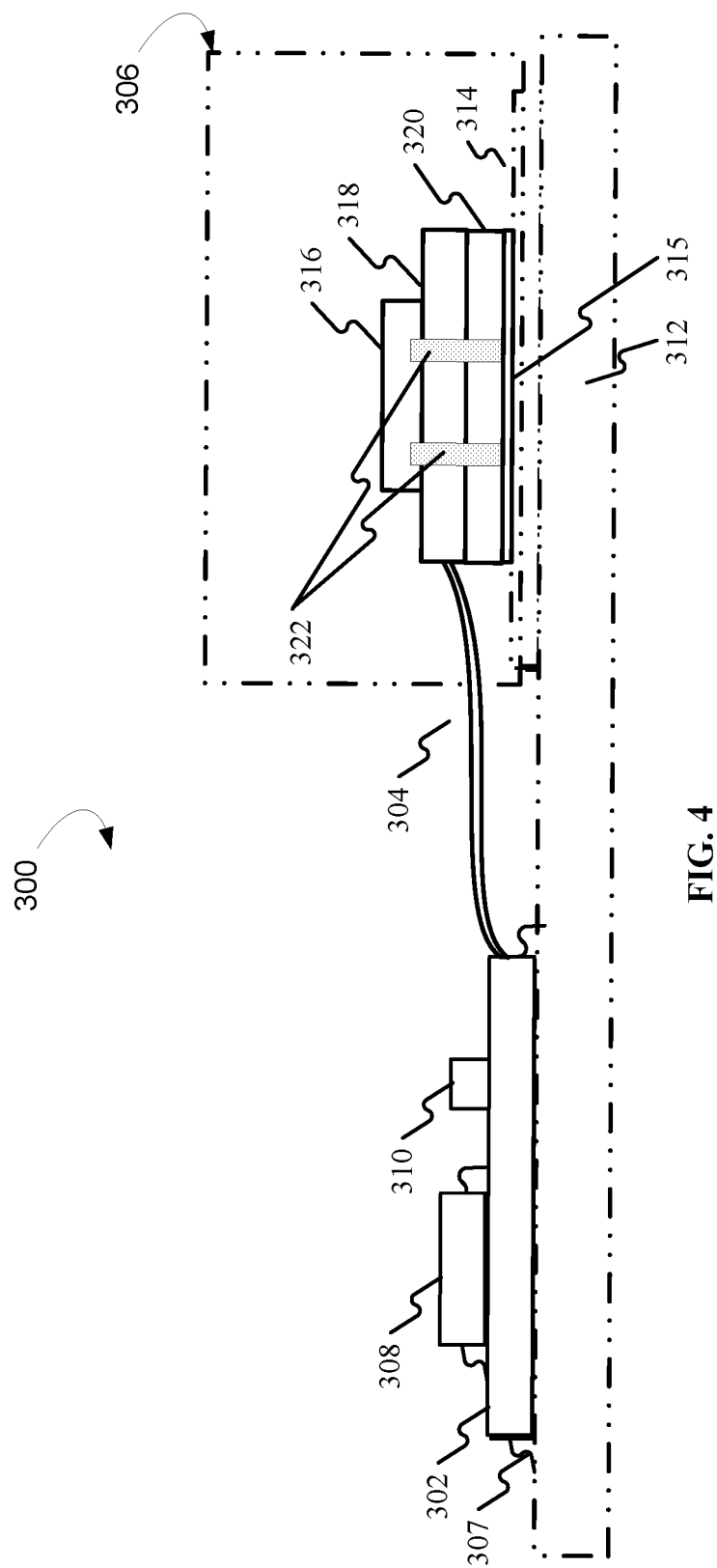

TEMPERATURE MEASUREMENT INTEGRATED CIRCUIT WITH FLEXIBLE CABLE AND SENSING ELEMENT

BACKGROUND

Exemplary embodiments pertain to the art of electronic temperature control, and more particularly, to a temperature measurement integrated circuit with a flexible cable and a sensing element.

Aerospace engine controllers may sometimes be mounted on engine structures of the aircraft. Because of the proximity to engine components, heat management in the electronic controller may be important. Consequently, particular electronic components may experience a wide range of temperatures, some of which may be outside of the range of allowable operating temperatures for that component. Typically, one or more electrical components within an electronic controller are identified as the limiting devices in terms of guaranteed performance for the operating temperature environment. For example, a processor in the engine controller may only be operative within a particular temperature range (e.g., −55° C. to 125° C.) and the processor dissipates relatively high power such that it is the hottest component within the electronic controller. In an aerospace engine electronic controller, it is advantageous to be able to maximize reliable controller performance over the temperature environment by monitoring the limiting electronic component(s).

Typical temperature sensing ICs are designed to monitor the temperature at the location that the IC is soldered to the PCB, without being in contact directly with the critical temperature limiting component. For example, without direct bonding of a sensing element to the electronic component, the sensing element may provide slow reaction time or incorrect correlation to temperature change of the critical component because it relies on detection based on a weak thermal connection between the temperature sensing IC and the critical component that needs to be monitored. Since the temperature sensing ICs do not directly measure the temperature of a critical electronic device or component, the temperature reading of the temperature sensitive component in existing systems may be inaccurate. Moreover, when sensors are not configured to directly measure the temperature of the mission-critical component, the controller may operate at a temperatures that could cause system failure and the temperature sensing and monitoring circuit may not register the temperature because of a self-heating effect between the sensor and the component, ambient air temperature, and other factors that affect the sensing element due to its proximity to the component being monitored.

BRIEF DESCRIPTION

Disclosed is a temperature sensing system that includes a temperature sensing element. The temperature sensing element is bondable to an exterior surface of an electronic component and configured to sense a temperature at an interior of the electronic component. The system further includes a flexible cable operatively connected to the temperature sensing element, and a signal conditioning unit operatively connected to a distal end of the flexible cable. The signal conditioning unit is mountable to a printed circuit board proximate to the electronic component. The signal conditioning unit is configured to receive a signal from the temperature sensing element, and output a signal indicative of the temperature at the interior of the electronic component.

Also disclosed is a method of sensing a temperature of an electronic component. The method includes bonding a temperature sensing element to an exterior surface of an electronic component. The temperature sensing element is configured to sense a temperature at an interior of the electronic component. The method further includes mounting a signal conditioning unit operatively connected to a distal end of a flexible cable connecting the signal conditioning unit. The signal conditioning unit is mounted to a printed circuit board proximate to the electronic component. The method further includes receiving a signal from the temperature sensing element, and outputting a signal indicative of the temperature at the interior of the electronic component.

BRIEF DESCRIPTION OF THE DRAWINGS

The following descriptions should not be considered limiting in any way. With reference to the accompanying drawings, like elements are numbered alike:

FIG. 4 is a front view of the temperature sensing system of FIG. 3 according to one embodiment.

DETAILED DESCRIPTION

A detailed description of one or more embodiments of the disclosed apparatus and method are presented herein by way of exemplification and not limitation with reference to the Figures.

There is a need to measure, monitor and/or control the temperature of critical components or devices that are part of electronic controls, sensors, or actuator systems. Embodiments described herein include an integrated circuit operatively connected to an integrated sensing element by a flexible cable or tape. In some aspects, the sensing element is mountable directly to an exterior surface of the component being sensed (e.g., bonded directly to an integrated circuit (IC) chip or other monitored component) to prevent incorrect temperature readings from adjacent heat sources. The small integrated circuit may be attached to the sensing element by the flexible cable, which can then be mountable next to the device on the circuit board. In some aspects, the point-of-use temperature sensing system described herein can provide wide applicability to various circuit board topologies in existing controllers due to the flexible cable connecting the sensor to the signal conditioning unit.

Figure 1:
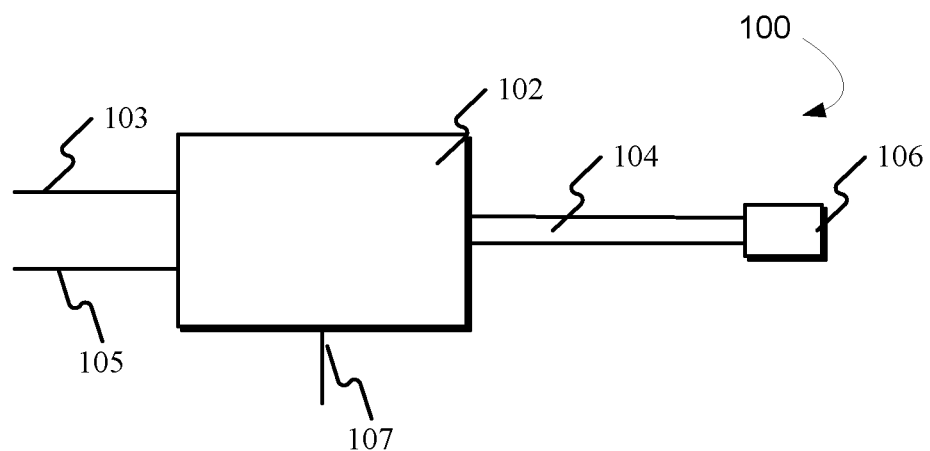
FIG. 1 is a top view of a temperature sensing system according to one embodiment.

FIG. 1 depicts a top view of a temperature sensing system 100 (hereafter "system 100") according to one embodiment. Referring now to FIG. 1, system 100 includes a signal conditioning unit 102, a flexible cable 104 operatively connected to signal conditioning unit 102, and a temperature sensing element 106 operatively connected to a distal end of flexible cable 104.

Signal conditioning unit 102 (hereafter "unit 102") is an integrated circuit configured for receiving information from a temperature sensor and processing the information to digital and/or analog output. Unit 102 may be any type of integrated circuit suitable for retrieving a temperature signal from a temperature sensing element and conditioning the signal for system-usable outputs. The system-usable outputs may be, for example, an analog output (e.g., a voltage) indicative of an interior temperature of the critical element being sensed, or a digital signal indicative of the temperature.

In some embodiments, unit 102 may be a small outline integrated circuit (SOIC). SOICs are surface-mounted integrated circuit (IC) packages that occupy a relatively small space in comparison to an equivalent dual in-line package (DIP) integrated circuit. This may be preferable to allow integration of system 100 in existing controllers or other applications where a temperature sensing system is retro-fit to an existing circuit board, and PCB space may be limited. In some aspects, unit 102 may be an 8 pin SOIC, a 16 pin SOIC, or another configuration. Unit 102 may include one or more inputs 107 for power and ground, one or more output channels 103 for analog communications, and one or more output channels 105 for digital and/or serial communications.

One embodiment may be configured to fit many existing integrated circuit packages such as, for example, ball grid array (BGA) packages. In some aspects, the flexible cable is an integral part of the IC package and provides flexibility with respect to fitting to various IC package topologies. For example, for a plastic SOIC package, the flexible cable can be connected to the IC lead frame such that the cable may be encapsulated in plastic along with the die and chip carrier.

Flexible cable 104 may be a communication cable or ribbon having multiple communication channels (not shown) connecting temperature sensing element 106 to unit 102. For example, flexible cable 104 may include a flat and flexible plastic film base with multiple metallic conductors bonded to one surface of the cable. In general, flat cables are used in place of round cables for easy cable management, especially in high-flex applications. Moreover, flexible flat cables usually take up less space than round cables, often offering better EMI/RFI suppression and eliminating wire coupling issues. In addition, because the wires are protected individually and not wrapped many times over by different materials as round cables are, they are lighter in weight and offer greater flexibility in integrating system 100 with existing circuit board architectures. Flexible cable 104 may be any length needed to provide a wide range of usability with existing controller PCBs. For example, flexible cable 104 may be 1" in length, 2", 5", etc.

According to one embodiment, flexible cable 104 is compatible with a pick and place machine such that the pick and place machine automatically places and solders the IC to a PCB board. For example, flexible cable 104 may be pre-formed, rolled up, folded upon itself, or packaged/restrained such that the flexible cable would not interfere with the pick and place machine during the manufacturing process when the IC would be placed and soldered on a PCB. Once the temp sensing IC is soldered and the critical component to be monitored is soldered, the flexible cable can be un-folded and bonded to the surface of the critical component.

Temperature sensing element 106 can be any temperature sensing device configured to sense a temperature of a component and transmit a signal via flexible cable 104 to unit 102. For example, temperature sensing element 106 may be a thermistor, a semiconductor temperature sensor, a thermocouple, a resistance temperature detector (RTD), or other sensor type of sensor.

Figure 2:
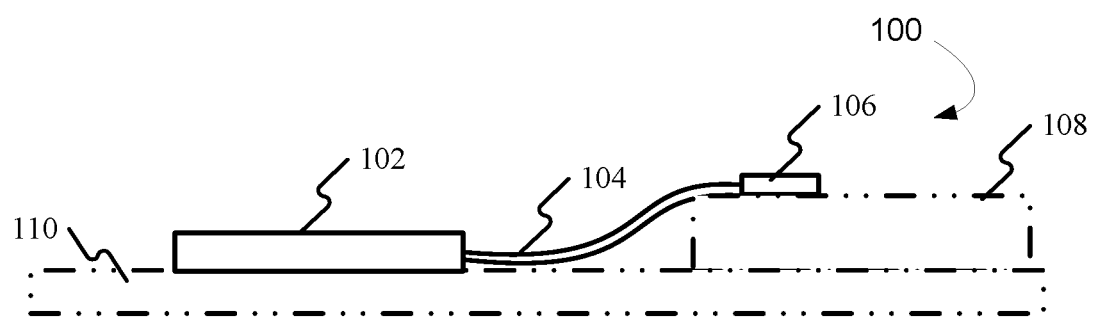
FIG. 2 is a front view of the temperature sensing system of FIG. 1 according to one embodiment.

FIG. 2 depicts a front view of the temperature sensing system of FIG. 1, according to one embodiment. Referring now to FIG. 2, signal conditioning unit 102 can be configured to mount directly to a printed circuit board (PCB) 110 proximate to an electronic component 108. For example, it may be advantageous to detect a temperature of electronic component 108 directly, which may be, for example, a main processor, a digital signal processing (DSP) module, or some other component. System 100 may be configured to retro-fit to an existing circuit board PCB and sense temperature directly at the point-of-use (e.g., mounted on PCB 110 and sensing electronic component 108). As shown in FIG. 2, flexible cable 104 allows unit 102 to be permanently mounted to an available portion of a PCB 110 and flexibly connect the temperature sensing element to an electronic component 108, which may be varying distances from the available portion of the PCB 110 where unit 102 is mounted.

According to one embodiment, temperature sensing element 106 is bondable to electronic component 108 at a point of use such that temperature sensing element 106 is in direct contact with the electronic component 108 being sensed.

In one embodiment, temperature sensing element may include an adhesive bonding substrate configured to adhere to electronic component 108. The adhesive bonding substrate may be, for example, an adhesive having thermally conductive properties such that unit 102 may receive a signal from temperature sensing element 106, and output a signal indicative of the temperature at the interior of the electronic component 108. Temperature sensing system 100 includes flex cable 104 that may be integrated in a standard plastic IC package. This configuration offers an advantage of being the most efficient in terms of miniaturization resulting in a compact package.

Figure 3:
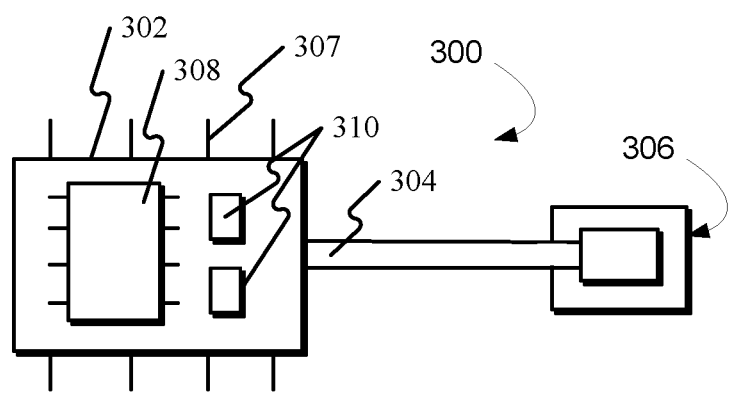
FIG. 3 is a top view of a temperature sensing system according to another embodiment.

According to another embodiment, a hybrid packaging technology such as rigid-flex (described in the Association Connecting Electronics Industries document IPC-2221) may be integrated with temperature sensing system 300. FIG. 3 depicts a top view of a temperature sensing system 300 integrating hybrid packaging technology, according to one embodiment. As shown in FIG. 3, system 300 may include a rigid PCB 302 and a flexible ribbon 304 connecting the rigid PCB 302 to a temperature sensing stack 306. Rigid PCB 302 may be configured to attach to a PCB board via one or more leads 307. FIG. 4 depicts one example of a PCB board attaching via leads 307.

Temperature sensing system 300 includes rigid PCB 302 that may be, for example, a PCB configured with a signal conditioning unit 308 and one or more additional circuit elements 310. Accordingly, the signal conditioning unit may be the entire a rigid printed circuit board (PCB) 302 that can include the additional signal conditioning components. One benefit of system 300 is the ability to add additional processing capabilities with additional circuit elements 310, such as, for example, communication features, timers, digital signal processing, etc. The technology is typically referred to as rigid-flex and is described in IPC-2221. The 302 PCB section is designed to allow components 308, 310 to be soldered and, typically, clip-on j-lead pins are attached so that the final "hybrid" can be soldered to a PCB per FIG. 4.

FIG. 4 depicts a front view of the temperature sensing system of FIG. 3 according to one embodiment. As shown in FIG. 4, temperature sensing stack 306 may include a temperature sensing element 316, a rigid PCB layer in connection with temperature sensing element 316, and a heat conductive bonding layer 320. Heat conductive bonding layer 320 may be a copper plane layer or other heat conductive material thermally connected to temperature sensing element 316 via at least one heat conductive vertical interconnect access (VIA) 322.

In some aspects, rigid PCB section 318 may include artwork for connecting temperature sensor 316 to flex cable 304 such that the temperature sensor's electrical signals are available for measurement by the signal conditioning circuitry contained on the rigid PCB section 302. For example, if temperature sensor 316 is a two wire RTD, then rigid PCB section 318 can include one or more pads configured for soldering down the RTD element, and the PCB artwork can connect the RTD terminals to the flex cable section (304) where the two wire connections would be used for measurement by the signal conditioning circuitry contained on PCB section 302. Heat conductive bonding layer 320 may be a thermally conductive rigid PCB layer such as, for example, a copper plane, metal foil, or another type of heat-conductive material. In some embodiments, heat conductive bonding layer 320 may be bonded to an electronic component 314 with a thermally conductive adhesive 315 intervening the electronic component 314 and the heat conductive bonding layer 320. In some aspects, temp sensing element 316 may be soldered onto PCB 318. Therefore, 302, 304, and 318 can be a single rigid flex circuit board design where 302, and 318 are configured as rigid PCB boards and 304 is the flex section. According to another embodiment, sensing element 316 may be soldered to flex section 304 directly, and rigid PCB 318 is omitted.

The one or more VIAs 322 may be, for example barrel-type VIAs having a heat-conductive material thermally connecting the sensing element to the electronic component.

Some embodiments, such as the embodiments depicted in FIG. 3 and FIG. 4, may provide a flexible solution that is customizable to various IC packages. For example, temperature sensing system 300 may be custom designed to have multiple flex cables with multiple temp sensing elements but processed by a single hybrid IC 302. Another benefit of this embodiments described herein is that they may be implemented without the need for expensive IC packaging technology. For example, some embodiments may apply temperature sensing system 300 using one or more standard off-the-shelf (i.e., purchased separately and not custom made) components 308, 310.

Embodiments of the present invention offer many benefits over conventional temperature sensing integrated circuits (ICs). Typical temperature sensing ICs are generally designed to monitor the temperature at the location that the IC is soldered to the PCB and, therefore, cannot directly measure the temperature of a critical electronic device or component, which may also be mounted on the board but in a different location than the temperature sensing IC. Further, measuring temperature proximate to a critical component may not be as accurate as measuring temperature directly. By measuring directly, the critical component temperature may be determined, monitored and/or controlled.

Other benefits of the present invention include providing the sensing element and processing element in a monolithic IC package. In some aspects, the flexible cable between the sensing element and the SOIC element can allow the signal conditioning unit to be mounted to a circuit board on an existing controller, and bond the sensing element to the element being sensed even when it is in a difficult-to-reach position with respect to the conditioning unit.

In other aspects, embodiments of the present invention can measure wider ranges of temperatures (e.g., −55° C. to 175° C.) than a typical temperature sensing IC. According to some embodiments of the present invention, only the temperature sensing element is being subjected to the critical temperature extremes whereas the signal conditioning electronics, that may be limited in operating temperature range, are mounted on a main PCB location and are not subjected to the extreme temperature range.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A temperature sensing system comprising:
   a temperature sensing element adhesively bonded to an exterior surface of an electronic component and configured to sense a temperature at an interior of the electronic component;
   a flexible cable operatively connected to the temperature sensing element, the flexible cable comprising a flat and flexible plastic film base with multiple metallic conductors; and
   a signal conditioning unit operatively connected to a distal end of the flexible cable, wherein the signal conditioning unit is mountable to a printed circuit board proximate to the electronic component, wherein the signal conditioning unit is configured to:
   receive a signal from the temperature sensing element; and
   output a signal indicative of the temperature at the interior of the electronic component.

2. The system of claim 1, wherein the signal conditioning unit is configured to be mounted proximate to the electronic component on a printed circuit board of an electronic controller.

3. The system of claim 2, wherein the signal conditioning unit is an integrated circuit configured to output an analog signal indicative of a voltage with respect to the temperature at the interior of the electronic component.

4. The system of claim 2, wherein the signal conditioning unit is configured to output a digital signal indicative of the temperature at the interior of the electronic component.

5. The system of claim 2, wherein the temperature sensing element is one of a thermistor, a thermocouple, and a resistance temperature detector (RTD).

6. The system of claim 2, wherein the temperature sensing element is a semiconductor device for sensing temperature.

7. The system of claim 1, wherein the temperature sensing element comprises:
 a printed circuit board (PCB) layer bonded to the temperature sensing element; and
 a heat conductive layer thermally connected to the temperature sensing element via at least one heat conductive vertical interconnect access (VIA).

8. The system of claim 7, wherein the flexible cable is restrained by folding or rolling.

9. The system of claim 7, wherein the heat conductive layer is a copper plane.

10. The system of claim 7, wherein the signal conditioning unit is a printed circuit board (PCB) comprising one or more signal conditioning components.

11. A method of sensing a temperature of an electronic component comprising:
 adhesively bonding a temperature sensing element to an exterior surface of an electronic component, wherein the temperature sensing element is configured to sense a temperature at an interior of the electronic component; and
 mounting a signal conditioning unit operatively connected to a distal end of a flexible cable connecting the signal conditioning unit, the flexible cable comprising a flat and flexible plastic film base with multiple metallic conductors, wherein the signal conditioning unit is mounted to a printed circuit board proximate to the electronic component;
 receiving a signal from the temperature sensing element; and
 outputting a signal indicative of the temperature at the interior of the electronic component.

12. The method of claim 11, wherein the signal conditioning unit is configured to be mounted proximate to the electronic component on a printed circuit board of an electronic controller.

13. The method of claim 12, wherein the signal conditioning unit is an integrated circuit, and outputting the signal indicative of the temperature at the interior of the electronic component comprises outputting an analog signal indicative of a voltage with respect to the temperature at the interior of the electronic component.

14. The method of claim 12, wherein outputting the signal indicative of the temperature at the interior of the electronic component comprises outputting a digital signal indicative of the temperature at the interior of the electronic component.

15. The method of claim 12, wherein the temperature sensing element is one of a thermistor, a thermocouple, and a resistance temperature detector (RTD).

16. The method of claim 12, wherein the temperature sensing element is a semiconductor device for sensing temperature.

17. The method of claim 11, wherein bonding the temperature sensing element to the exterior surface of the electronic component further comprises:
 bonding a printed circuit board (PCB) layer to the temperature sensing element; and
 connecting a heat conductive layer thermally to the temperature sensing element via at least one heat conductive vertical interconnect access (VIA).

18. The method of claim 17, further comprising restraining the flexible cable by folding or rolling.

19. The method of claim 17, wherein the heat conductive layer is a copper plane.

20. The method of claim 17, wherein the signal conditioning unit is a printed circuit board (PCB) comprising one or more signal conditioning components.

\* \* \* \* \*